Jan. 21, 1964     S. LOOSLI     3,118,315

BELT TIGHTENER

Filed Aug. 1, 1961

STANLEY LOOSLI
INVENTOR
HUEBNER & WORREL
ATTORNEYS
BY
Richard M. Worrel

United States Patent Office 3,118,315
Patented Jan. 21, 1964

3,118,315
BELT TIGHTENER
Stanley Loosli, Rte. 1, Box 1, Ashton, Idaho
Filed Aug. 1, 1961, Ser. No. 128,424
2 Claims. (Cl. 74—242.12)

The present invention relates to an adjustable mounting for shafts and the like and more particularly to such a mounting having advantageous application to the mounting of pulleys for belts to permit convenient, speedy, and precise belt tightening.

In prior art devices employed to maintain a pulley, or the like, in an adjusted position to tension an endless belt, the support for the pulley normally includes a pair of members, one at opposite ends of the shaft on which the pulley is mounted. A pair of such opposed members usually comprises individual adjusting devices, such as threaded rods, which support their respective ends of the shaft in a predetermined relation to the frame on which the belt is carried for operation.

In certain structures, the adjustable mounting may comprise a single member, threaded for advancing and retracting to a desired adjusted position in relation to the frame. The member supports a cross-head which carries opposed bearings in which the pulley shaft is rotatably mounted. The cross-head is usually prevented from turning about the longitudinal axis of the threaded member by laterally opposed extensions of the frame which afford bearing surfaces for the cross-head.

To maintain such a pulley in position for proper operation, its axis of rotation must normally be constrained to right-angular relation to the longitudinal dimension of the belt. If the pulley is not so positioned, either the pulley shaft is subjected to undue wear, or the belt tends to be displaced to one side of the pulley resulting in accelerated wear of the belt as well as improper operation.

Accordingly, it is the principal object of the present invention to provide an improved adjustable mounting for shafts and the like.

Another object is to provide a unitary structure to effect and maintain tension of a belt by adjustable positioning of a pulley over which the belt operates.

Another object is to provide a pulley adjusting mechanism which does not require members external of the adjusting portion of such mechanism to maintain the pulley in the desired plane of operation.

Another object of the invention is to provide adjusting mechanism for a pulley wherein the mechanism includes a rotatable member to effect adjustment and the reaction force thereof is not transmitted to the pulley shaft.

A further object is to reduce the form of an adjustable mounting for a pulley to a simple and reliable structure which facilitates installation and adjustment of a belt trained over the pulley.

A further object is to provide a belt tensioning device wherein all of the elements required to adjust and to maintain the alignment of the pulley are immediately adjacent to the frame on which the pulley is supported.

These, together with other objects, will become more fully apparent upon reference to the following description and accompanying drawing.

Figure 1:
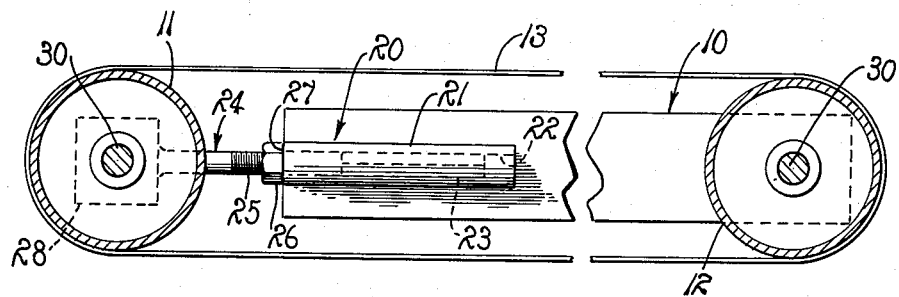
FIG. 1 is a side elevation of a conveyor and frame structure embodying the present invention, the frame being foreshortened for illustrative convenience.

Referring to the drawing, a portion of a frame structure is shown at 10 on which are mounted a plurality of rotatable pulley wheels or cylinders 11 and 12. Trained about the pulleys is a belt 13 which is constrained to operate in a circuitous path by means of the pulleys. Such a belt system normally has a driving pulley, such as pulley 12, which is rotatably driven in fixed relation to the frame structure. One or more of the idler pulleys, such as 11, is mounted on the frame in an adjustable manner so that the tension of the belt can be adjusted, as desired.

It is to be understood that the pulleys and the belt typify an operational environment illustrative of the utility of the device of the subject invention. Other illustrative environments will readily occur to those skilled in the art. For example, sprockets may be substituted for the pulleys and a chain may replace the belt.

Figure 2:
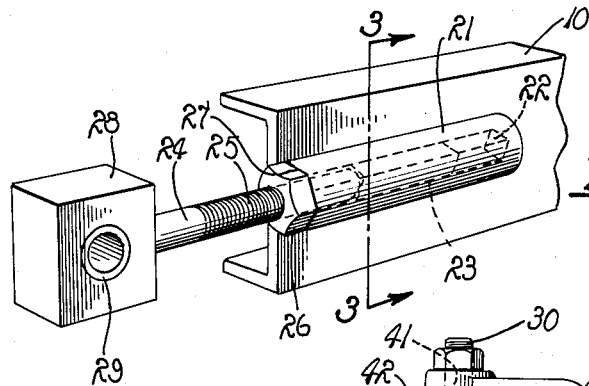
FIG. 2 is a perspective fragmentary view of the frame showing the adjusting mechanism mounted thereon.

In the structure shown in FIG. 1, the pulley 11 is an elongated cylindrical member about which is trained the belt 13, which is a transversely extended conveyor belt. Each end of the cylindrical pulley 11 is adjustably mounted on the frame 10 by a pair of mechanisms, one of which is indicated at 20. The details of each adjustable support member 20 are shown in FIG. 2 and comprise a scabbard 21 secured to the frame by any suitable means, such as welding. The scabbard is provided with a socket 22 which is polygonal in cross-section, as best shown in FIG. 3.

Slidably received within the socket 22 is a bayonet end 23 of an elongated, rod-shaped, adjusting member 24. The end 23 has a periphery corresponding to the cross-section of the socket 22 to form a sliding bayonet connection therewith. The socket and end may be of any interfitted non-rotatable form, such as the square shape shown. An intermediate portion 25 of the adjusting member is provided with screw-threads which are engaged by a circumscribing adjustment nut 26. The nut engages and bears upon an outer shoulder 27 of a scabbard 21 to advance the adjusting member longitudinally outwardly from the frame 10.

The outer end of the adjustment member carries a cross-head 28 as a load bearing portion, and the head is provided with a transversely extended bore 29. Received within the respective bores 29 of each of the adjustable supports are the opposite ends of a pulley shaft 30. Rotatably mounted on the shaft is the cylindrical pulley 11, adjustable movement of which changes the degree of tension in the belt 13.

Figures 3, 4:
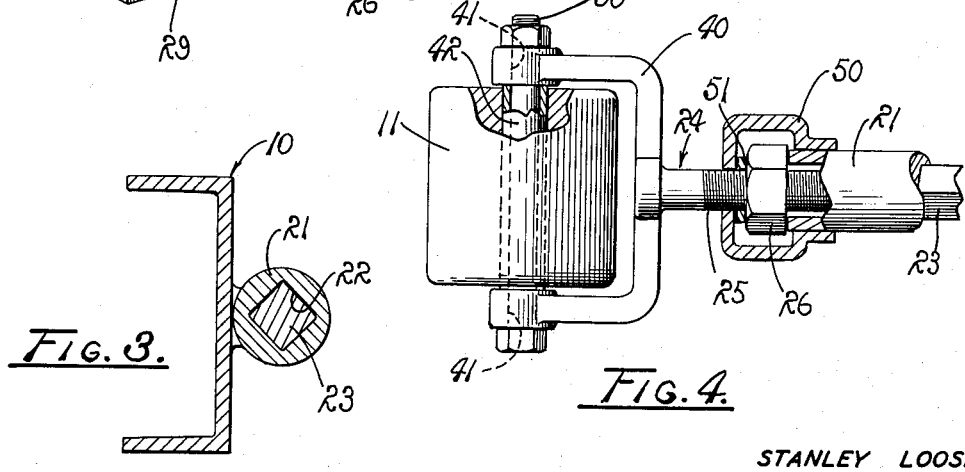
FIG. 3 is a vertical section taken on line 3—3 of FIG. 2.
FIG. 4 is a fragmentary plan view of a second form of the device of the present invention.

A modified form of the adjustable pulley support is shown in FIG. 4, in which a single member is employed to carry both ends of the pulley shaft 30. The intermediate portion 25 of the adjusting member 24 terminates in a bifurcated portion 40 to serve as a bearing yoke. Both arms of the bifurcated portion are provided with suitable aligned transverse bores 41 which receive the pulley shaft 30. The idler pulley 11 is rotatably mounted on the shaft by means of any suitable bearing, indicated at 42.

As in the form illustrated in FIGS. 1 through 3, the adjustment nut engages the threads of member 24 to advance and to retract the end 23 in relation to socket 22. To facilitate retraction independent of belt tension in the modified form of FIG. 4, a retainer cage 50 is secured to scabbard 21 and receives the nut 26 in fixed axial position therein. This prevents outward movement of the adjustment member except by rotation of adjustment nut. A suitable thrust washer 51 is preferably interposed the cage and the nut to permit easy rotation of the nut during any desired longitudinal adjustment of member 24.

OPERATION

The operation of the described embodiment of the subject invention is believed to be readily apparent and is briefly summarized at this point. With the conveyor structure of FIG. 1, the adjusting member 24 of each of the adjustable supports 20 is first inserted into its respective socket, and the pulley 11 is then mounted on the supports by means of the shaft 30. The adjusting nut 26 is moved outwardly on the intermediate portion so as to allow penetration of the bayonet end 23 into the socket 22 a sufficient distance to permit the belt to be trained over pulley 11. After the conveyor belt 13 has been trained about the pulleys 11 and 12, both of the supports are then extended by rotation of the adjustment nuts 26 to extend the members 24 until the belt has been satisfactorily tensioned. It should be noted that both of the adjusting members 24 can be advanced simultaneously to effect a speedy, accurate adjustment of the idler pulley. The support does not require any extension of the frame 10 to maintain the pulley shaft in a properly adjusted position.

With previous adjustable supports having a rotatable element, rotation of that element during adjustment causes a reaction force which is transmitted to the crosshead 28. The torque of this reaction force can result in misalignment and damage to the bearing for the pulley 11. With the adjustable support bodying the principles of the present invention, all such reaction force is transmitted to the frame 10. The interfitting bayonet end 23 and socket 22 are effective at all times to maintain the proper position of cross-head 28 with respect to the pulley shaft.

With the modified form of support, the socket 22 and bayonet 23 cooperate also to perform the desired function of maintaining the pulley shaft in right-angular relation to the longitudinal dimension of the belt. When the device is provided with the retainer cage 50, the adjustment nut 26 is held within the cage prior to inserting bayonet 23 into the socket 22. Subsequent rotation of the nut 26, as it engages the threaded portion 25, effects desired retraction of the pulley 11. As with the device of FIG. 1, the reaction force acting upon the member 24 during adjustment is transmitted to the frame so as not to effect the desired relation of the pulley to the belt. Accordingly, the tension of the belt can be readily selected and maintained by a unitary adjustment member which precludes the possibility of any misalignment of the pulley shaft with respect to the longitudinal dimension of the belt.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an endless belt conveyor constrained for movement in a circuitous path about a pair of rotatable pulleys carried by a frame, an adjustable mounting for one of the pulleys to effect selective tightening of the belt comprising a scabbard secured to the frame and provided with an outwardly opening socket; an elongated rod having opposite ends; bearing means carried on one end of the rod and affording an axis of rotation for said one pulley, the other end of the rod having a periphery conforming to said socket to preclude rotation of the rod therein and being longitudinally slidably received therein, the rod having an intermediate portion provided with screw threads thereon; an adjusting nut abutting the scabbard member adjacent to the outwardly opening socket and being screw-threadably connected to said intermediate portion to advance the rod from said socket upon rotation of the nut in a first direction; and a retaining cage for the nut carried by the frame in fixed relation to the scabbard and engaging the side of the nut opposite from the scabbard to serve as a reaction member upon rotation of the nut in an opposite direction to retract the rod into said socket.

2. A belt tightener for an endless belt constrained for movement in a predetermined circuitous path by rotatable pulleys carried by a frame comprising a scabbard having a socket of polygonal cross-section mounted on the frame; an elongated support rod having a portion thereof slidably received in said socket for a predetermined range of longitudinal movement and having a free end spaced from said portion, said portion having a periphery conforming to said polygonal cross-section of said socket; rotatable means carried on the rod to effect an axial advance of said rod to a selected position in said range of movement; bearing means mounted on the free end of said rod to support one of said pulleys for rotation; and restraining means rigidly carried by the frame in fixed relation to the scabbard and engaging said rotatable means so that force exerted by said rotatable mens to retract the rod into the scabbard is reacted against said restraining means.

References Cited in the file of this patent

UNITED STATES PATENTS

| 668,663 | Stillman | Feb. 26, 1901 |
| 2,480,294 | Hume | Aug. 30, 1949 |
| 3,028,693 | Malzahn | Apr. 10, 1962 |

FOREIGN PATENTS

| 602,978 | Great Britain | June 7, 1948 |